T. T. PROSSER.
NUT LOCK BOLT.
No 103,775. Patented May 31, 1870.
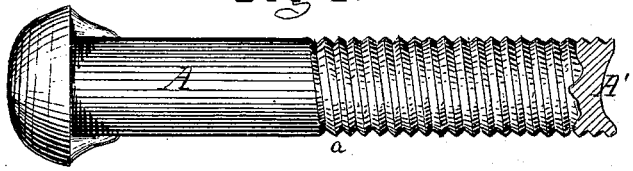
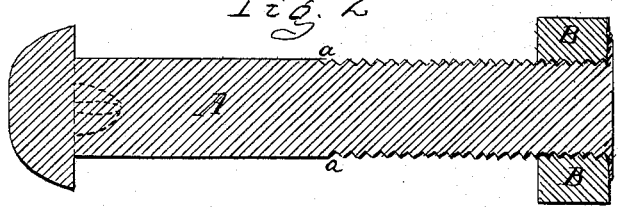
Attest
T H Sprague
R Edw J Gib
T. T. Prosser
Inventor
D. P. Holloway & Co.
Attys

United States Patent Office.

TREAT T. PROSSER, OF CHICAGO, ILLINOIS.

Letters Patent No. 103,775, dated May 31, 1870.

IMPROVEMENT IN NUT-LOCK BOLT.

The Schedule referred to in these Letters Patent and making part of the same.

*To all whom it may concern:*

Be it known that I, TREAT T. PROSSER, of Chicago, in the county of Cook and State of Illinois, have invented a certain Improvement in Screw-Bolts; and I do hereby declare that the following is a full, clear, and exact description thereof, reference being had to the annexed drawings making part of this specification, in which—

Figure 1 is a side view of a screw-bolt, partly in section, to show the concavity in its threaded end.

Figure 2 is an axial section thereof, a nut being shown on the threaded end, which has been riveted down over such nut.

The nature of my invention consists in producing, as a new article of manufacture, a screw-bolt, in the threaded end of which a concavity is formed, either by the operation of cutting the thread or by countersinking, so that, after the nut has been screwed on, the end of the bolt may be riveted down over the same, and thus firmly hold it in place.

To enable those skilled in the art to make and use my invention, I will proceed to describe its construction and operation.

In the drawings—

A represents the bolt, and
B, the nut.

The screw-thread is formed on the bolt by beginning to cut at the base, or at *a*, and proceeding outward to its end, so that on approaching the point the metal will be somewhat drawn out on the periphery of the bolt, whereby a concavity, A', is formed in its end, and also the thread on the end of the bolt made less full or slightly tapering, so that the nut can be screwed on more easily. By this operation the fiber of the metal on the point or end of the bolt is not cut off, but remains on, and can afterward be riveted down.

It will be found that by proceeding to cut the thread on a bolt in the manner above set forth, the end of such bolt will be made sufficiently concave that its edges can be easily bent down over the nut by a few strokes with a hammer.

This concavity may, however, be formed in the end of the bolt by countersinking.

The nuts of screw-bolts which are subject to vibrations have heretofore been secured by screwing a second or jam-nut upon the first nut, or by employing nut-locks.

Both these methods are objectionable by reason of the additional expense which had to be incurred, in order to secure the nuts on the ends of the screw-bolts, so that they would not turn, and thus become loosened.

The construction of my bolt dispenses with the use of a second nut, or any other device for preventing the turning of the nut, it being only necessary, after the nut has been screwed on, to strike the end of the bolt a few blows with a hammer, in order to rivet it down over the nut, as shown in fig. 2, whereby the turning of the nut is effectually prevented.

My invention is applicable to all screw-bolts, the length of which may be definitely determined, such, for instance, as are used in fish-joints of railroads.

Having thus described my invention,

What I claim, and desire to secure by Letters Patent, is—

As a new article of manufacture, a screw-bolt, constructed with a concavity in its threaded end, substantially as and for the purpose set forth.

In testimony whereof I have signed my name to this specification in the presence of two subscribing witnesses.

TREAT T. PROSSER.

Witnesses:
GEORGE G. STREET,
EDWARD O. WALLER.